US010616080B2

(12) United States Patent
Eckert et al.

(10) Patent No.: US 10,616,080 B2
(45) Date of Patent: Apr. 7, 2020

(54) SYSTEM FOR DIAGNOSIS OF ROBOT STATE

(71) Applicant: Fanuc America Corporation, Rochester Hills, MI (US)

(72) Inventors: Isaac Eckert, Grand Blanc, MI (US); Gordon Geheb, Hartland, MI (US); Bradley Q. Niederquell, Troy, MI (US); Yi Sun, West Bloomfield, MI (US); Jason Tsai, Bloomfield Hills, MI (US); Rick E. Wunderlich, Canton, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 39 days.

(21) Appl. No.: 14/951,557

(22) Filed: Nov. 25, 2015

(65) Prior Publication Data

US 2016/0149996 A1    May 26, 2016

Related U.S. Application Data

(60) Provisional application No. 62/084,899, filed on Nov. 26, 2014.

(51) Int. Cl.
*H04L 29/08* (2006.01)
*H04L 12/26* (2006.01)
*G05B 23/02* (2006.01)

(52) U.S. Cl.
CPC .......... *H04L 43/06* (2013.01); *G05B 23/0264* (2013.01); *H04L 67/12* (2013.01); *H04L 67/2842* (2013.01)

(58) Field of Classification Search
CPC ..... H04L 43/06; H04L 67/12; H04L 67/2842; G05B 23/0264
See application file for complete search history.

(56) References Cited

U.S. PATENT DOCUMENTS 6,466,844 B1 * 10/2002 Ikeda ..................... B25J 9/1682
318/565
7,162,409 B2    1/2007 Noma
(Continued)

FOREIGN PATENT DOCUMENTS

| EP | 1640832 A2 | 3/2006 |
| JP | 2005346636 A | 12/2005 |
| JP | 2006099735 A | 4/2006 |

*Primary Examiner* — Philip J Chea
*Assistant Examiner* — Wuji Chen
(74) *Attorney, Agent, or Firm* — Shumaker, Loop & Kendrick, LLP; John A. Miller

(57) ABSTRACT

A robot data transfer method includes the step of collecting data from each of a plurality of robots in a multi-robot production facility in real-time. The data collected from the robots is then transferred in real-time from a controller of each of the robots to a first data collection device. Within the first data collection device, the data is buffered using a multi-segment queueing mechanism. The queueing mechanism is configured with a retention policy. The data is then transferred to a second data collection device based on the retention policy of the queueing mechanism of the first data collection device. The second data collection device analyzes the data and determines whether maintenance or optimization is necessary for any of the robots.

19 Claims, 4 Drawing Sheets

(56) References Cited

U.S. PATENT DOCUMENTS

| | | | |
|---|---|---|---|
| 8,121,729 B2 | 2/2012 | Blanc et al. | |
| 8,588,241 B1* | 11/2013 | Li | H04L 47/2441 |
| | | | 370/412 |
| 2002/0161478 A1* | 10/2002 | Ikeda | B25J 9/1682 |
| | | | 700/245 |
| 2003/0200060 A1* | 10/2003 | Eryurek | G05B 23/0229 |
| | | | 702/188 |
| 2009/0179766 A1* | 7/2009 | Kashio | B25J 9/1674 |
| | | | 340/686.1 |
| 2015/0127124 A1* | 5/2015 | Kobayashi | B25J 9/1689 |
| | | | 700/83 |
| 2015/0328774 A1* | 11/2015 | Yajima | B25J 9/1674 |
| | | | 700/261 |
| 2017/0185068 A1* | 6/2017 | Nishi | G05B 19/4063 |
| 2018/0099413 A1* | 4/2018 | Naitou | B25J 9/1674 |
| 2018/0164779 A1* | 6/2018 | Kim | G05B 19/4063 |

\* cited by examiner

SYSTEM FOR DIAGNOSIS OF ROBOT STATE

CROSS-REFERENCE TO RELATED APPLICATION

This Application claims the benefit of U.S. provisional patent application Ser. No. 62/084,899 filed Nov. 26, 2014 hereby incorporated herein by reference in its entirety.

FIELD OF THE INVENTION

The invention relates to a system and method for diagnosing a robot state to minimize downtime in a multi-robot production facility.

BACKGROUND OF THE INVENTION

Modern manufacturing facilities often utilize a variety of robots to automate production processes. Robots may be arranged in cells, wherein several robots each perform the same process. For example, several robots may all be configured to perform an identical welding process on a work piece. Alternately, several robots may be utilized on an assembly line, wherein each robot performs unique steps of a production sequence.

Although robots are effective for maximizing efficiency, they are not without drawbacks. Unlike their human counterparts, robots are generally unable to communicate when they may experience a problem. For example, bearings or encoders of the robot may fail after a period of time without warning based on variable operating conditions, such as travel distances, temperatures, and load conditions.

Under standard operating conditions, maintenance periods may be scheduled at regular intervals. However, regularly scheduled intervals may be excessive when operating conditions are less extreme than standard, resulting in components being replaced prematurely, and unnecessarily increasing maintenance costs.

Alternatively, regularly scheduled intervals may be insufficient where operating conditions are more extreme than standard. In this instance, the robots may experience unexpected problems before the scheduled maintenance period. Unexpected failures are particularly problematic in the case of high-volume production facilities for a variety of reasons.

First, production facilities generally try to minimize the number of spare parts that are inventoried in-house in an effort to minimize costs. Accordingly, replacement parts must often be ordered. In the case of robots, many replacement parts may have long lead times, resulting in extended periods of time that the robot remains inoperable.

Additionally, production schedules are generally planned days or weeks in advance, wherein each of the robots in the production facility is expected to output a predetermined amount of work. Unexpected downtime of a single robot may negatively impact an entire production facility, as manufacturing processes downstream of the inoperable robot may be starved of expected work pieces. As a result, production may fall behind schedule.

Accordingly, there exists a need in the art for a system and method for proactively determining necessary maintenance and optimization of robots in order to schedule and minimize downtime, extend mechanical life of the robot, and reduce maintenance costs.

SUMMARY OF THE INVENTION

Concordant and consistent with the present invention, a system and method for proactively determining necessary maintenance and optimization of robots has surprisingly been discovered.

In a first embodiment, a robot data transfer method includes the step of collecting data from each of a plurality of robots in real-time. The data collected from the plurality of robots is then transferred in real-time from a controller of each of the robots to a first data collection device. Within the first data collection device, the data is buffered using a multi-segment queueing mechanism. The queueing mechanism is configured with a retention policy. The data is then transferred to a second data collection device based on the retention policy of the queueing mechanism of the first data collection device.

In another embodiment, a robot analytical and prognostic reporting method includes the step of collecting data in a first data collection device. The collected data is then transferred to and stored in a second data collection device. The second data collection device may be remote from or local to the first data collection device. The data is then analyzed within the second data collection device and a report is generated, wherein the report is based on the analysis of the data. A determination for a controller parameter change, an anomaly, or a failure is identified in the report, and the report is distributed to at least one recipient.

In yet another embodiment, a robot analytical and optimization reporting system includes at least one robot having a programmable controller. The controller of the robot is configured to collect dynamic data from the robot. A first data collection device is in real-time communication with the controller of the robot, and is configured to receive the dynamic data from the controller. The first data collection device is configured to buffer the dynamic data for a duration. The system further includes a second data collection device in communication with the first data collection device. The second data collection device is configured to receive and analyze the dynamic data from the first data collection device. A recipient is in communication with the second data collection device.

DESCRIPTION OF THE FIGURES

The above, as well as other advantages of the present invention will become readily apparent to those skilled in the art from the following detailed description, particularly when considered in the light of the drawings described herein.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1:
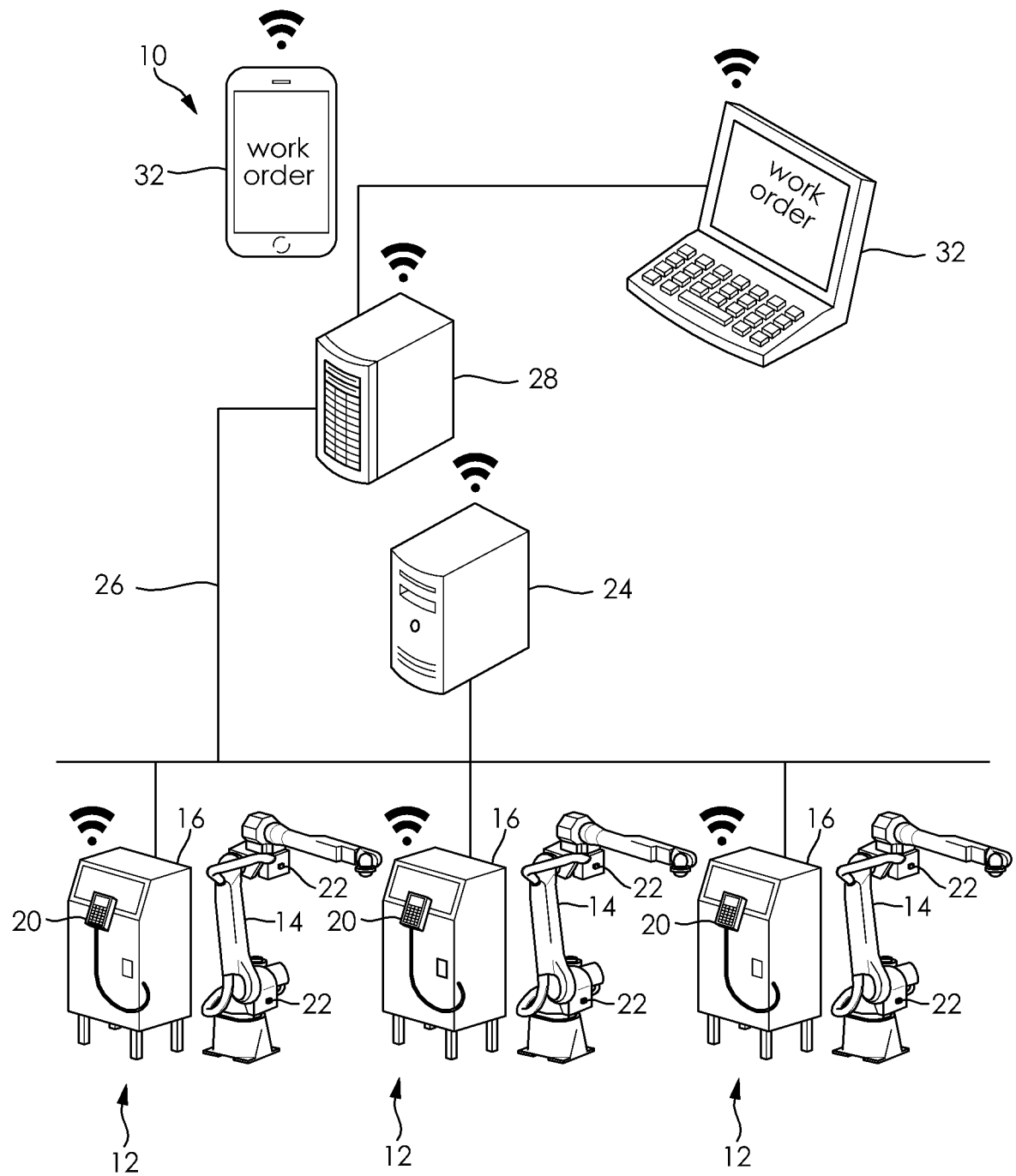
FIG. 1 is a schematic diagram of a system according to a first embodiment of the disclosure.
Figure 2:
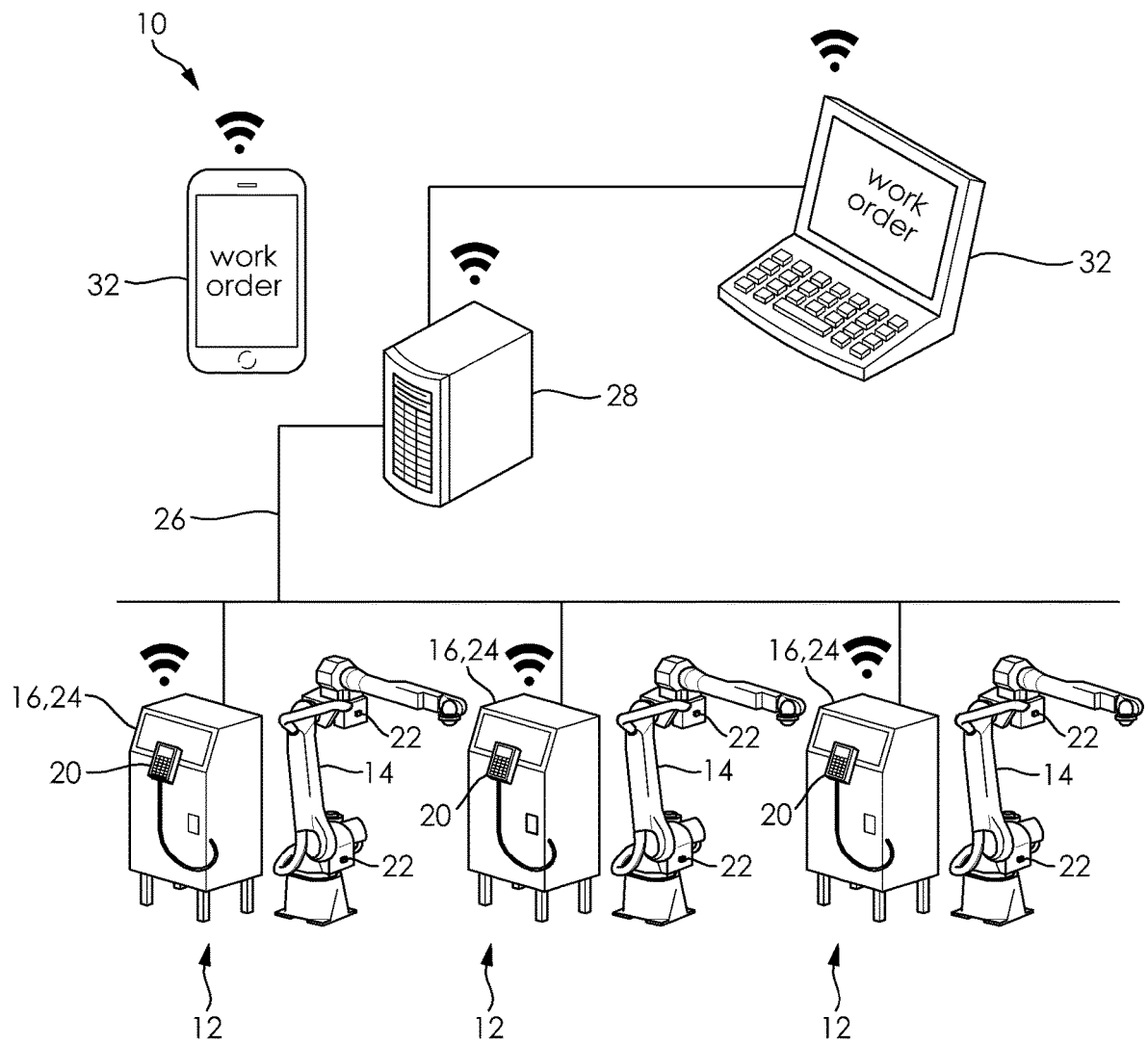
FIG. 2 is a schematic diagram of a system according to a second embodiment of the disclosure.
Figure 3:
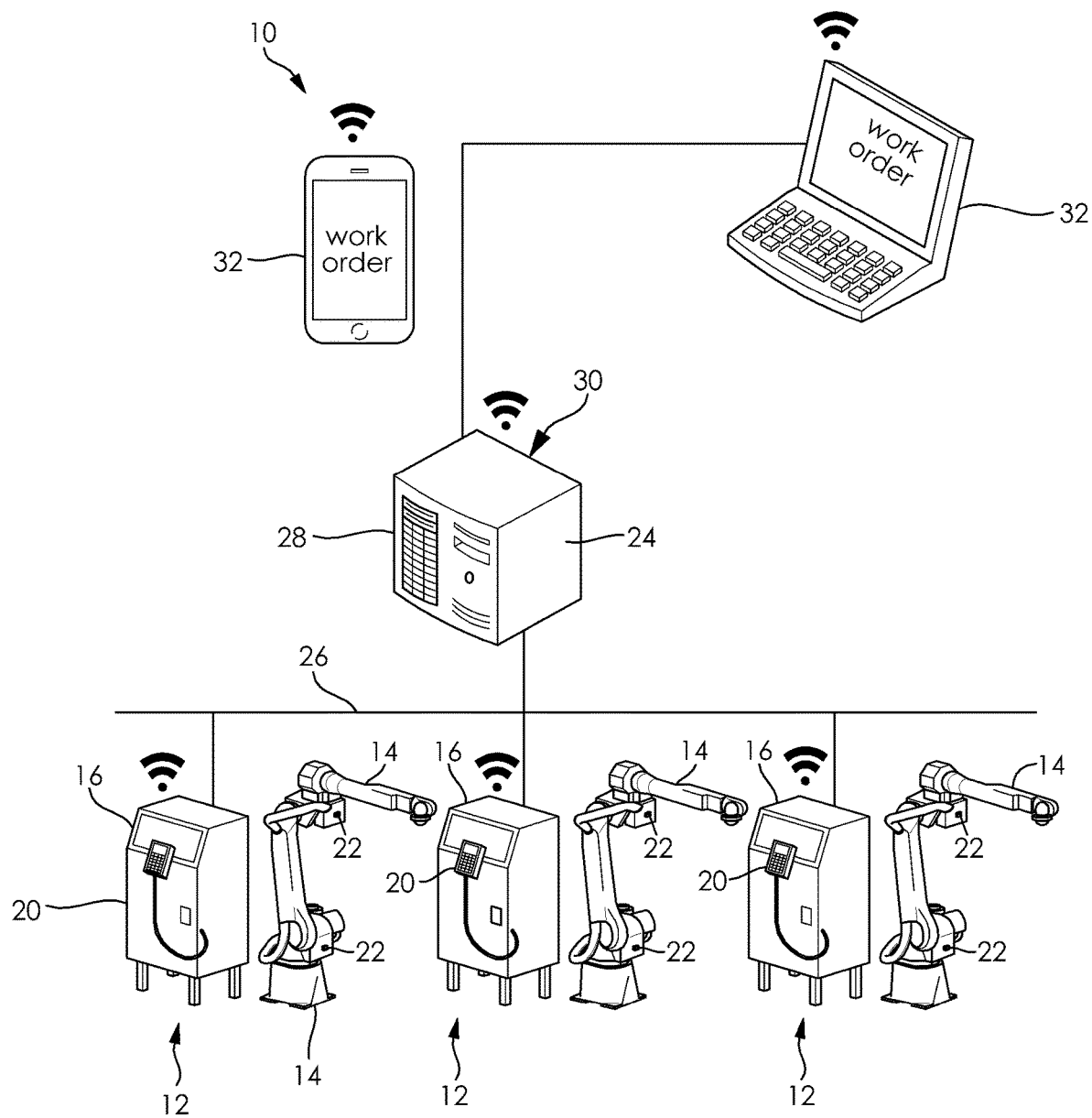
FIG. 3 is a schematic diagram of a system according to a third embodiment of the disclosure.

As shown in FIGS. 1-3, a system 10 for minimizing downtime includes at least one robot 12. In the illustrated embodiment, the system 10 includes a plurality of robots 12. Each of the robots 12 includes a multi-axis robotic arm 14 configured to perform an action on a workpiece, such as cutting, welding, or manipulation, for example.

The robot 12 includes at least one programmable controller 16 having a memory storage device for storing a plurality of types of data. As used herein, a "controller" is defined as including a computer processor configured to execute software or a software program in the form of instructions stored on the memory storage device. The storage device may be any suitable memory type or combination thereof. As also used herein, a "storage device" is defined as including a non-transitory and tangible computer-readable storage medium on which the software or the software program, as well as data sets, tables, algorithms, and other information, may be stored. The controller 16 may be in electrical communication with the memory storage device for purposes of executing the software or the software program.

The controller 16 may include a user interface 20 for allowing a user to enter data or programs into the controller 16, or for accessing the data stored therein. The user interface 20 may include a display for displaying the information to the user.

The controller 16 may be a robot controller 16, wherein in such a case, the controller 16 is coupled to the robot 12 for actively performing a variety of actions. It is understood that the present invention is not limited to robot controllers 16. As a non-limiting example, the controller 16 may be a passive controller 16, such as a monitoring device that monitors predetermined conditions of the robot 12.

A plurality of sensors 22 on the robot 12 collect dynamic data from the robotic arm 14 based on the predetermined conditions. The sensors 22 may include odometers for measuring robotic arm joint travel distance and direction, thermometers for measuring joint operating temperatures, and load cells for measuring operating loads on the joints, for example. The sensors 22 are in communication with the controller 16, wherein the controller 16 collects the dynamic data from the sensors 22 in real-time.

The system 10 may further include a first data collection device 24 in real-time communication with the programmable controllers 16. As shown in FIGS. 1 and 3, the first data collection device 24 may be a physical disk located external to the controllers 16, wherein the first data collection device 24 is in communication with the plurality of the controllers 16 via a functional network 26. In an alternate embodiment of the system 10, the first data collection device 24 may be a logical or virtual disk incorporated in the memory storage device of the controller 16 of each robot 12, as shown in FIG. 2.

The functional network 26 may be a local or wide area network of the programmable controllers 16 or may be a direct link between the controllers 16 and the first data collection device 24. Further, the functional network 26 may include wireless communication capabilities, such as Wi-Fi, Bluetooth, or cellular data networks.

The first data collection device 24 includes a multi-segment queuing mechanism having a plurality of prioritized segments. For example, the queueing mechanism may have a high priority segment and a low priority segment. The queueing mechanism includes a data retention policy, and is configured to buffer the data based on at least one of an event, priority, duration, size, transfer rate, data transformation to optimize throughput, or data storage requirements.

At least one second data collection device 28 may be in communication with the first data collection device 24 via the functional network 26. The second data collection device 28 may be a network server configured to process the dynamic data received from the first data collection device 24. As shown in FIGS. 1 and 2, the second data collection device 28 may be an independent network server connected to the first data collection device 24 via the functional network 26. The second data collection device 28 may be located in the same room or building as the first data collection device 24, or it may be located in an entirely different building, which may or may not be located in the same geographic vicinity as the first data collection device 24.

As shown in FIG. 3, the second data collection device 28 may alternately be formed local to the first data collection device 24, wherein the integrally formed first data collection device 24 and second data collection device 28 form a data collection unit 30 in communication with each of the plurality of the controllers 16 via the functional network 26.

The second data collection device 28 is configured to analyze the dynamic data received from the first data collection device 24, and to determine when maintenance or optimization of a particular robot 12 of the system 10 is necessary. Maintenance may include repair or replacement of specific components of the robot 12 based on anomalies or failures identified by the second data collection device 28. Optimization may involve changing parameters of the controller 16 to maximize efficiency of the robot 12.

The system 10 further includes a recipient 32 in communication with at least one of the first data collection device 24 and the second data collection device 28 via the functional network 26. In the illustrated embodiments, the recipients 32 include a smart device, such as a cellular phone or a tablet, and a network terminal, such as a personal computer. However, the recipient 32 may be any device capable of receiving analyzed dynamic data from the second data collection device 28, such as a second server, application software, a web browser, an email, and a robot teaching device, for example. Alternately, the recipient 32 may be a person who receives a printout directly from the second data collection device 28.

Figure 4:
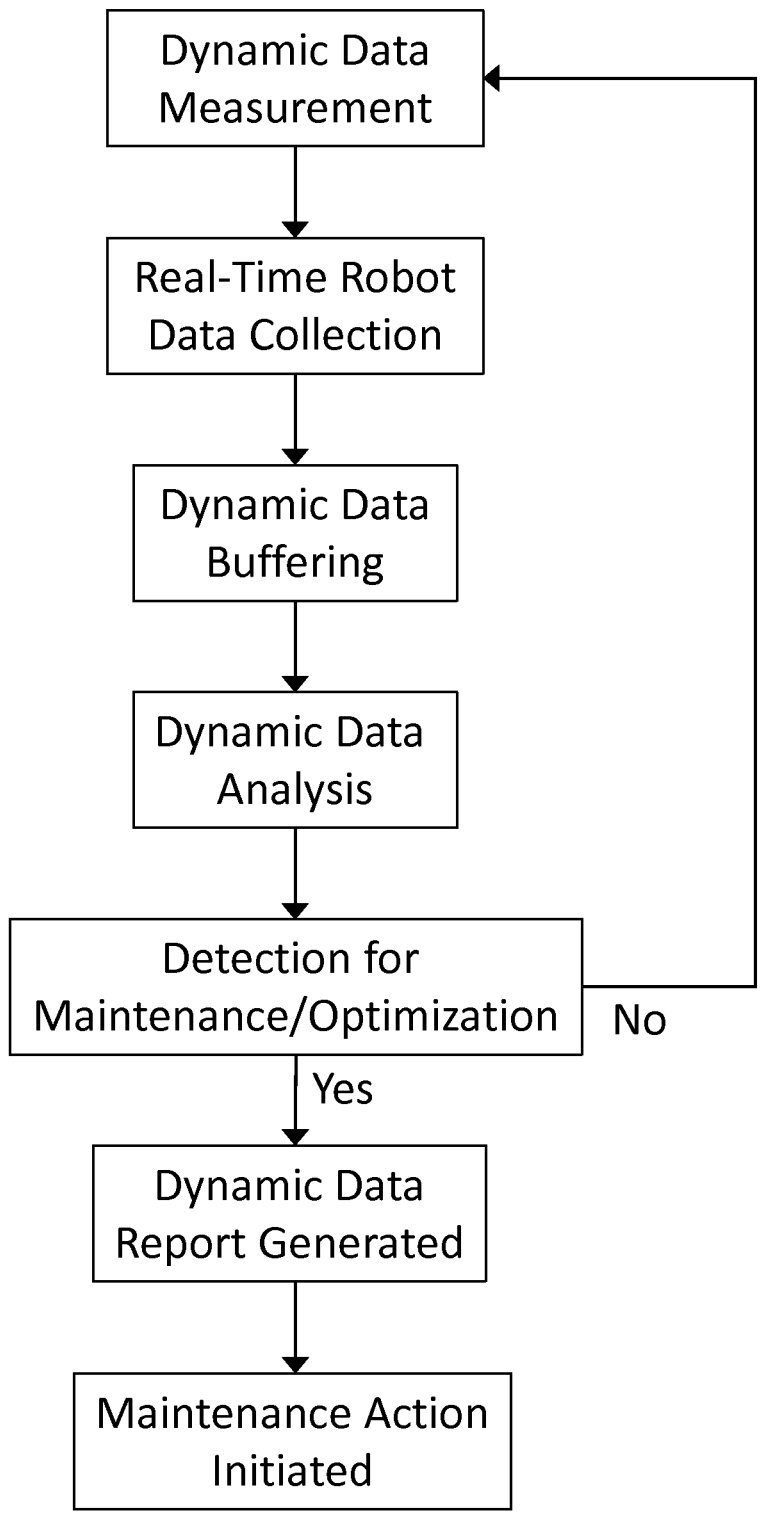
FIG. 4 is a schematic block diagram of a method for diagnosing a robot state, according to one embodiment of the disclosure.

In use, as shown in FIG. 4, the sensors 22 of each of the robots 12 measure the dynamic data during operation, including joint travelling distances, component operational load, component operational temperature, component high speed emergency stops, joint reverse travel conditions, and other dynamic data relevant to the operation of the robot.

The dynamic data measured by the sensors 22 is then collected by the controller 16 and transferred to or extracted by the first data collection device 24.

The dynamic data is buffered in at least one of the segments of the first data collection device 24 based on priority, wherein higher priority dynamic data is buffered in the higher priority segment, and lower priority dynamic data is buffered in the lower priority segment. It is understood that the queueing mechanism may include any number of prioritized segments, wherein respective dynamic data may be buffered.

The dynamic data retained in the prioritized segments of the queueing mechanism based on the retention policy of the queueing mechanism. The retention policy retains and prioritizes the dynamic data based on at least one of a triggering event, priority, duration, size, transfer rate, data transformation to optimize throughput, or data storage requirements.

Upon occurrence of a triggering event, the dynamic data is transferred from the first data collection device 24 to the second data collection device 28. The triggering event may be received from the controller 16 or an external triggering device. Alternately, the event may be triggered internally by the first data collection device 24. In one embodiment, an entirety of the dynamic data stored in the first data collection device 24 may be transferred to the second data collection device 28 when the triggering event occurs. Alternately, upon occurrence of the triggering event, the first data collection device 24 may interrupt transfer of the lower priority dynamic data, and initiate a transfer of the higher priority dynamic data to the second data collection device 28.

Dynamic data received by the second data collection device 28 is then analyzed to determine whether maintenance or optimization of the robot 12 is necessary. The determination of maintenance or optimization is based on consideration of each type of the dynamic data. For example, the second data collection device 28 may evaluate travel distance, temperature, high speed emergency stops, joint reverse travel conditions, and other dynamic data in determining whether maintenance or optimization of any one of the plurality of the robots 12 is necessary. More particularly, intervals between maintenance periods may be increased or decreased where operating conditions of a robot 12 are determined to be less extreme or more extreme than standard operating conditions, respectively. For example, occurrences of high temperatures, high speed emergency stops, and joint reverse travel conditions may factor into a decreased interval between maintenance periods.

If the second data collection device 28 does not determine that maintenance or optimization is necessary, the data collection and analysis process may continue repeatedly. Alternately, In the event that second data collection device 28 determines that maintenance or optimization of any of the robots 12 is necessary, the second data collection device 28 may generate a report including a readout of the analyzed dynamic data. The report includes information related to detecting pre-failure conditions and minimizing system 10 downtime, including motion and mechanical health, process health, system health, and maintenance notifications.

The report may include specific information relating to particular robots 12 in the system 10. The report may include a maintenance or optimization notification identifying specific components of the robot 12 that need to be replaced, such as bearings, encoders, or controls, for example. The report may also provide projections relating to robots 12 that are approaching a need for maintenance or optimization, allowing the recipient 32 to optimize future production schedules based on anticipated downtime.

When the report includes a maintenance or optimization notification, the notification is provided to at least one of the recipients 32 so that a maintenance action may be initiated. The notification is received by the recipient 32 and displayed to the user, so that the user may initiate the maintenance action, such as creating a work order or scheduling down time for the robot 12.

Alternately, the second data collection device 28 may be configured to initiate the maintenance action automatically. When the second data collection device 28 determines that any of the robots 12 requires maintenance, the second data collection device 28 may generate a work order, order replacement components, or schedule down time for the robot 12 without input from the user.

The system 10 disclosed herein advantageously improves efficiency of manufacturing facilities by minimizing downtime. For example, by collecting, storing, and analyzing dynamic data related to operating conditions of each robot 12, intervals between maintenance periods may be adjusted specifically to each individual robot 12.

In the case of robots 12 subjected to more extreme operating conditions, intervals between maintenance periods can be reduced from a standard interval, and unexpected failures can be prevented. By scheduling maintenance periods based on dynamic data, robot 12 downtime can be scheduled based on replacement component availability, and production schedules can be adjusted in advance to accommodate for reduced production capacity.

Alternately, when a robot 12 is subjected to less extreme operating conditions, intervals between maintenance periods can be extended beyond the standard interval, eliminating unnecessary replacement of components, and minimizing maintenance costs.

While certain representative embodiments and details have been shown for purposes of illustrating the invention, it will be apparent to those skilled in the art that various changes may be made without departing from the scope of the disclosure, which is further described in the following appended claims.

What is claimed is:

1. A robot data transfer method comprising the following steps:
    collecting data from sensors on each of a plurality of robots in real-time;
    transferring the data from a controller of each of the robots to a first data collection device in real-time;
    buffering the data in the first data collection device using a multi-segment queuing mechanism with a retention policy, wherein the data is retained according to the retention policy based on at least one of a triggering event, priority, duration, size, transfer rate and data transformation to optimize throughput or data storage requirements; and
    transferring the data from the first data collection device to a second data collection device based on the retention policy.

2. The method according to claim 1, further comprising the step of analyzing the data in the second data collection device to determine a need for maintenance or optimization of the robots.

3. The method according to claim 1, further comprising the step of generating a report from the second data collection device, wherein the report includes at least one of a mechanical health, a process health, a system health, and a maintenance notification.

4. The method according to claim 1, wherein the first data collection device is a logical device within the controller of the robot.

5. The method of claim 1, wherein the first data collection device is a physical storage device, external to the controller of the robot.

6. The method of claim 1, wherein the second data collection device is a network server, the network server connected to the first data collection device via a functional network.

7. The method of claim 1, wherein the second data collection device is formed local to the first data collection device, the second data collection device in direct communication with the first data collection device.

8. The method according to claim 1 including the following steps:
    the data transferred to the first data collection device is buffered in the data storage with capability of maintaining data for some duration; and the first data collection device transfers the data entirely to the second data collection device in response to one of an event from the robot controller or external device, and an internally triggered event on the first data collection device.

9. The method according to claim 1 including the following steps:
the data transferred to the first data collection device is buffered in the data storage with capability of maintaining data for some duration; and
the first data collection device queues the data into priority segments and interrupts a lower priority segment data transfer and transfers the data from a higher priority segment to the second data collection device or the server.

10. The method of claim 1, wherein the data includes at least one of a joint travel distance, a component operational load, a component operational temperature, component high speed emergency stops, and joint reverse travel condition.

11. A robot analytical and prognostic reporting method comprising the following steps:
collecting data from sensors on each of a plurality of robots in a first data collection device;
buffering the data in the first data collection device using high priority and low priority queueing segments and a retention policy, wherein the data is retained according to the retention policy based on at least one of a triggering event, priority, duration, size, transfer rate and data transformation to optimize throughput or data storage requirements;
transferring the data from the first data collection device to and storing the data in a second data collection device, based on the retention policy, the second data collection device being remote to or local to the first data collection device;
analyzing the data in the second data collection device;
generating a report from the second data collection device, the report based on the analysis of the data by the second data collection device;
identifying a determination for a robot controller parameter change, anomaly, or failure in the report; and
distributing the report to at least one recipient.

12. The method according to claim 11 wherein the recipient is at least one of a smart device, a server, application software, an email, a personal computer, and a robot teaching device.

13. The method according to claim 11, further comprising the step of generating a work order based on the analysis of the data.

14. The method of claim 11, wherein the data includes at least one of a joint travel distance, a component operational load, a component operational temperature, component high speed emergency stops, and joint reverse travel condition.

15. A robot analytical and optimization reporting system comprising:
at least one robot, the robot having a programmable controller configured to collect dynamic data from sensors on the robot;
a first data collection device in electrical communication with the controller of the at least one robot, the first data collection device configured to receive the dynamic data from the controller, and to buffer the dynamic data in a multi-segment queue for a duration determined by a retention policy, wherein the data is retained according to the retention policy based on at least one of a triggering event, priority, duration, size, transfer rate and data transformation to optimize throughput or data storage requirements;
a second data collection device in communication with the first data collection device, the second data collection device configured to receive the dynamic data from the first data collection device, and to analyze the dynamic data; and
a recipient in communication with the second data collection device for receiving the analysis of the dynamic data.

16. The system of claim 15, wherein the first data collection device is a logical device within a memory of the controller of the robot.

17. The system of claim 15, wherein the first data collection device is a physical storage disk, formed separately from the controller.

18. The system of claim 15, wherein each of the controller, the first data collection device, the second data collection device, and the recipient is in communication with a functional network.

19. The system of claim 15, wherein the second data collection device is formed local to the first data collection device.

* * * * *